Oct. 6, 1925.

T. E. CROCKETT 1,556,310

AUTOMATIC PRESSURE CONTROL VALVE

Filed Sept. 14, 1922

Witness:
Jas. E. Hutchinson.

Inventor:
Thomas E. Crockett
By J. E. Hutchinson Jr.
Attorney

Patented Oct. 6, 1925.

1,556,310

UNITED STATES PATENT OFFICE.

THOMAS E. CROCKETT, OF KANSAS CITY, MISSOURI.

AUTOMATIC PRESSURE-CONTROL VALVE.

Application filed September 14, 1922. Serial No. 588,226.

*To all whom it may concern:*

Be it known that I, THOMAS E. CROCKETT, a citizen of the United States, residing at Kansas City, in the county of Jackson and State of Missouri, have invented certain new and useful Improvements in Automatic Pressure-Control Valves, of which the following is a specification, reference being had therein to the accompanying drawing.

This invention relates to valves and more particularly to valves for automatically controlling pressure in fluid supply lines.

The invention is particularly designed to automatically control the air supply to gas generating mechanism, although it is capable of many uses, and I therefore wish it understood that the invention is not limited in any respect to the uses for which it was designed, as it may be employed in any instances where the automatical control of fluid pressure is desired.

One of the principal objects of the invention is to provide a valve constructed in such manner that very fine and delicate adjustments may be made so that the proper amount of fluid may be allowed to pass the valve on its way to any apparatus to which it is attached.

Another and important object is the provision of a novel form of gate seat and gate which are so associated with one another that a flexible and yet positive seating of the gate is obtained and also free opening and closing of the valve whereby relatively small differences in pressure are capable of controlling the movements of the valve.

Figure 1:
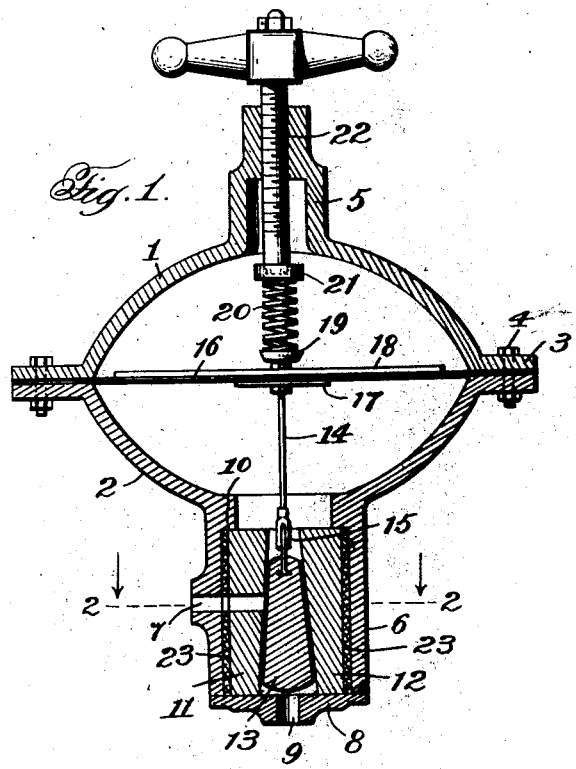
Figure 2:
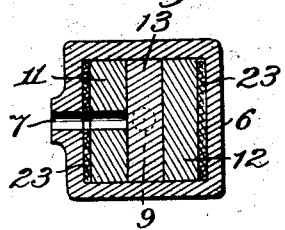

Further objects of the invention will appear as the following specific description is read in connection with the accompanying drawing which forms a part of this application and in which Figure 1 is a vertical sectional view taken through the valve; and Figure 2 is a horizontal section taken on the line 2—2 of Figure 1.

Referring to this drawing, 1 and 2 represent the upper and lower halves of the casing both of which are substantially semi-globular in outline and which are provided with laterally extending annular flanges 3 correspondingly perforated to receive coupling bolts 4. The upper half of the casing is provided with an internally threaded boss 5 and the lower half 2 of the casing is provided with an open ended housing 6, adapted to receive the valve seat plates as will be hereinafter described. This housing is provided with an inlet port 7 at one side adapted to be coupled with any suitable source of fluid under pressure, and the open end of the casing is closed by a removable cap 8 which is provided with a port 9 for the discharge of the fluid when the valve is in open position.

Seated in the housing 6 between the closing plate 8 and shoulders 10 are the valve seat members 11 and 12 each provided with an inclined inner face forming a tapered valve seat and space in which the sliding valve gate 13 is positioned. This valve gate is provided with side walls which converge from their lower to their upper ends so as to correspond with the tapered surfaces of the seat members 11 and 12 and is operated by a rod 14 having a swiveled connection 15 with said valve gate 13 at its lower end and a permanent connection with the diaphragm 16, which extends across the casing and has its peripheral edges clamped between the flanges 3 by the bolts 4.

The diaphragm is as usual reinforced by upper and lower metallic plates 17 and 18, and in the center above the rod 14 there is provided a cup-shaped member 19 to receive the lower end of a spiral compression spring 20. The upper end of this spring is seated in a similar cup-shaped member formed on the lower end of an adjusting screw 22 threaded into the boss 5.

The members 11 and 12 as well as the valve gate 13 are formed of glass or similar material and the contacting faces are ground and polished to obtain thoroughly tight contacting surfaces which will prevent any leakage between the parts.

In order to insure a resilient contact between the seat members and the valve gate there is interposed between the seat members and opposite side walls of the housing 6, rubber gaskets 23. By this arrangement it will be seen that when the gate 13 is pulled up into wedging contact with the seat members the gaskets will be placed under tension and remain in this condition until the gate is released by a reduction of pressure on the exhaust end of the system.

I have designed this valve for employment in connection with a gas generating system using air pressure, and the valve is so employed that the pressure of air is determined largely by the opening and closing of the burner valves at the point of consumption of the gas. This system has been fully explained in a co-pending application filed of even date herewith, Serial No. 588,227, and therefore further description of the system is unnecessary. It is sufficient to say that when the pressure is reduced at the outlet of the housing, the spring 20 will act to open the gate 13 and upon increasing the pressure at this point the valve will gradually close due to the pressure on the under side of the diaphragm until the valve is fully closed when all burner valves have been cut off.

The seat member 11 is shown to be provided with a port 24 communicating with the port 7 in the housing 6, and it is of course, understood that the gasket on that side of the seat has a corresponding opening so that the fluid may have free access to the discharge port 9 when the valve gate is open.

By use of the adjusting screw 22 the amount of pressure required to open and close the valve gate may readily be determined, and as the pitch of this adjusting screw is relatively low, fine adjustment can be conveniently obtained and the supply of fluid governed to a fine degree. The employment of a glass gate and glass seat members with highly polished surfaces insures not only proper adjustment and seating of the valve but also insures long life with little or no attention.

If it is desired at any time to renew the gate or seat members this may be readily accomplished by a removal of the cap plate 8, when the gate and seat members may be easily taken out and replaced or resurfaced. The resilient gaskets may be also replaced in this manner.

I claim:—

1. In a valve, a housing, seat members arranged on opposite sides of the housing, one of which only is provided with an inlet port, a closure member for the housing having an outlet port, resilient gaskets interposed between the seat members and the housing, a gate member having tapered side surfaces adapted to wedgingly engage the seat members and place the resilient members under compression and control the inlet port, means for lifting the gate member into contact with the seat members, and means for adjustably controlling the lifting means.

2. In a valve, a housing having shoulders therein, a pair of opposed seat members arranged upon opposite sides of the housing and engaged at one end with said shoulders, a removable cap member for closing said housing engaged with the opposite ends of said seat members and arranged to hold them in position within the housing and against said shoulders, resilient gaskets interposed between the housing and seat members, and a valve gate operatively interposed between said seat members and arranged to wedge against the seat members and place said gaskets under pressure.

3. In a valve, a casing, a diaphragm extending across said casing, a housing secured to one side of the casing and having an inlet port, seat members arranged within the housing, one of said seat members having a port communicating with the inlet port, a wedge-shaped gate interposed between the seat members and arranged to close the port in one of them, a connection between the gate and the diaphragm and means to control the action of the diaphragm.

4. In a valve, a housing having shoulders therein, a pair of opposed seat members arranged upon opposite sides of the housing and engaged at one end with said shoulders, a removable cap member for closing said housing engaged with the opposite ends of said seat members and arranged to hold them in position within the housing and against said shoulders, a valve gate operatively interposed between said seat members, and means for lifting the gate member into contact with said seat members.

In testimony whereof I affix my signature.

THOMAS E. CROCKETT.